United States Patent Office.

MORGAN W. BROWN, OF NEW YORK, N. Y.

Letters Patent No. 94,558, dated September 7, 1869.

IMPROVED MODE OF CLOSING PAPER BAGS.

The Schedule referred to in these Letters Patent and making part of the same.

*To all whom it may concern:*

Be it known that I, MORGAN W. BROWN, of the city and county of New York, in the State of New York, have invented a new and useful mode or process for a composition of matter for the purpose of treating and softening the upper parts of paper sacks and bags, to render the same better applicable for fastening or closing.

The nature of my invention consists in preparing paper bags by the use of a composition of matter, consisting of glycerine and an alkali, glycerine being the radical or base, and any caustic or carbonated deliquescent alkali auxiliary to the perfecting of this composition for the purpose, and the application of the solution to the upper part of paper sacks or bags, to soften and to render them more pliable.

To enable others skilled in the art to make, prepare, and use my materials, and its application to the upper parts of paper sacks and bags, I will proceed to describe the mode or process, first, of preparing the chemical solutions, &c., preparatory to and for the purposes herein set forth.

First, I use the purified glycerine of commerce, diluted with water (hot water is preferable) to about 10° Baumé, specific gravity, or from 10° to 15°, and mix the two well together, by stirring.

Second, I dissolve pearl-ash in hot water to about 5° Baumé, specific gravity, and after it has become clear by repose, I add about ten parts of this solution to every one hundred parts of the diluted glycerine solution, and incorporate the whole thoroughly together.

I now apply the solution, hot or quite warm, to the sacks or bags aforesaid, with a brush or by immersion, or in any other suitable manner, to dampen, moisten, or to saturate the same, to produce the intended effect of softening the upper parts of the sacks or bags.

I do not confine myself to exact proportions of the substances used in this composition, or to the exact number of degrees of the density; but I find that about the proportions herein specified answer the best purposes, and are very applicable. I also use the solution cold or at common temperatures to advantage, but I prefer to use it hot, as it penetrates and absorbs more rapidly.

I find that any of the alkaline salts in solution, answer the purposes herein set forth, but I prefer the use of pearl or soda-ash in the composition of matter.

What I claim as my invention, and desire to secure by Letters Patent, is—

A paper bag, having its top softened, and leaving the body in its original state, substantially as described, as a new article of manufacture.

MORGAN W. BROWN.

Witnesses:
WM. F. MCNAMARA,
C. NEGLEY BETTS.